United States Patent [19]
Han et al.

[11] Patent Number: 6,055,599
[45] Date of Patent: Apr. 25, 2000

[54] HIERARCHICAL CROSSBAR INTERCONNECTION NETWORK FOR A CLUSTER-BASED PARALLEL PROCESSING COMPUTER

[75] Inventors: Jong-Seok Han; Kyoung Park; Won-Sae Sim; Woo-Jong Hahn; Kee-Wook Rim, all of Daejeon, Rep. of Korea

[73] Assignee: Electronics & Telecommunications Research Institute, Daejeon, Rep. of Korea

[21] Appl. No.: 09/143,787

[22] Filed: Aug. 31, 1998

Related U.S. Application Data

[63] Continuation-in-part of application No. 08/678,577, Jul. 5, 1996, abandoned.

[30] Foreign Application Priority Data

Sep. 11, 1995 [KR] Rep. of Korea ...................... 95-40552

[51] Int. Cl.[7] .................................................. G06F 13/00
[52] U.S. Cl. .......................... 710/132; 710/100; 710/131; 709/200; 712/11
[58] Field of Search ..................................... 395/280, 311, 395/312, 800.11, 800.12; 709/200; 710/100, 131, 132; 712/11

[56] References Cited

U.S. PATENT DOCUMENTS

| 5,175,824 | 12/1992 | Soderbery et al. | 395/312 |
|---|---|---|---|
| 5,555,543 | 9/1996 | Grohoski et al. | 395/200.39 |
| 5,560,027 | 9/1996 | Watson et al. | 395/800.12 |
| 5,566,342 | 10/1996 | Denneau et al. | 395/800.11 |

*Primary Examiner*—Meng-Ai T. An
*Assistant Examiner*—Nabil El-Hady
*Attorney, Agent, or Firm*—Antonelli, Terry, Stout & Kraus, LLP

[57] ABSTRACT

The present invention relates to a hierarchical crossbar inter-connection network for a cluster-based parallel processing computer. A crossbar network is composed of the "n" number of crossbar switches which is byte sliced, eight links for connecting eight nodes, and two links for connecting other clusters. In addition, one low-level cluster is formed by connecting a maximum of eight processing nodes between the two crossbar networks, and one high-level cluster is formed with a maximum of eight low-level clusters and the four crossbar networks. Moreover, one next high-level clusters formed with a maximum of eight high-level clusters and the eight crossbar networks for scalability.

12 Claims, 5 Drawing Sheets

BCS: BYTE-SLICED CROSSBAR SWITCH

■ BYTE-SLICED CROSSBAR SWITCH a) A STRUCTURE OF A PACKET

PC: PACKET CLASS
E: EMERGENCY
B: BROADCAST
DTAG: DESTINATION TAG b) INFORMATION FIELDS OF THE TAG

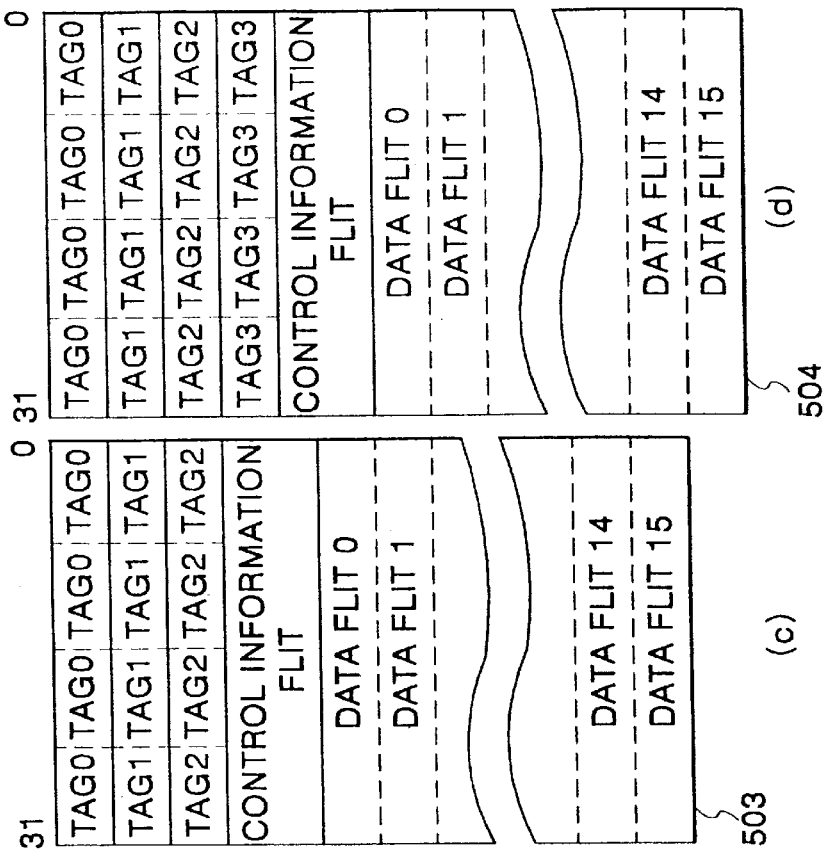

ced by the fact that
the number of links per node is increased as the number of
system nodes is increased and accordingly, the system can
not be easily expanded.

HIERARCHICAL CROSSBAR INTERCONNECTION NETWORK FOR A CLUSTER-BASED PARALLEL PROCESSING COMPUTER

This appln is a cont-in-part of Ser. No. 08/678,577 filed Jul. 5, 1996, abandoned.

BACKGROUND OF THE INVENTION

1. Field of the Invention

The present invention relates to an interconnection network for a cluster-based parallel processing computer and more particularly to a hierarchical crossbar inter-connection network for a cluster-based parallel processing computer used to efficiently provide data transmission paths and connecting so as to enable the processing nodes of the network to receive/send data at a high-speed.

2. Description of the Prior Art

The interconnection network of the parallel processing computer is one of the major elements for determining the architecture and performance of a parallel processing computer. Each conventional parallel processing system has a unique architecture that is suitable for an application that it is used for. The most important element for determining these architectural characteristics is a connection architecture. That is, an interconnection network used to connect the processors on a system is the most important.

Most parallel processing systems are configured in a hierarchical structure and are generally configured in two or three hierarchical structures.

The lowest hierarchy is configured with an uniprocessor node or SMP node (symmetric multiprocessing node). An SMP node has one connection structure and accordingly it is regarded as one sub-system capable of carrying out an independent execution.

Uniprocessor nodes or SMP nodes of the above are connected to form a cluster. Generally, a cluster is capable of carrying out independent executions.

According to conventional technology, an interconnection network is largely classified into an indirect interconnection network and direct interconnection network.

The indirect interconnection network of the former normally has a multi-stage connection structure; it is a inter-connection network capable of setting up paths in the switches of connection networks and has basically deadlock-free characteristics. However, it is a blocking network where all the paths cannot be set up at the same time. Accordingly, to overcome the above weakness, the research on the topology of an interconnection network used to obtain high performance having a low cost, efficient routine scheme, and the capability to set up the paths of all the combinations and tolerate a single fault is being carried out vigorously.

However, not all of the indirect inter-connection networks can be easily expanded due to their non-hierarchical structures and accordingly are not suitable to the cluster-based parallel processing systems, having hierarchical structures.

Therefore, Howard Thomas Olnowich successfully developed a Multi-Function Network for providing redundant paths through the use of an 8×8 crossbar switch in order to overcome blocking problems (Howard Thomas Olnowich,et al., Multi-Function Network, European Publication, No. 0505782 A2, Sep. 30, 1992).

However, this Multi-Function Network was not suitable for a cluster-based parallel processing system having a hierarchical structure.

In addition, Non-blocking Multicast Switching System (Jonathan S. Turner, Non-blocking Multicast Switching System, U.S. Pat. No. 5,179,551, Jan. 12, 1993) and Packet-Switched Intercommunication Network (Napolitan L M, Packet-switched intercommunication network for distributed memory, parallel processor computers), successfully developed by Napolitano L M are both multistage interconnection networks that are characterized by the non-blocking capability, low data delay latency and fault tolerance capability.

However, they are found to not be suited for cluster based parallel processing systems having a hierarchical structure.

On the other hand, the direct interconnection network of the latter had a point-to-point connection between each node and routing control is carried out by router of each node (processor).

This direct interconnection network is basically a deadlock connection network and the routing algorithm is used to ensure deadlock-free capability. Moreover, since it has expendability unlike the above indirect interconnection network, it has been used widely for most commercial parallel processing systems. However, the direct interconnection network has a relatively longer data delay time between nodes and the number of links per node is relatively more in comparison with the indirect interconnection network.

Accordingly, for these types of direct interconnection networks, the research on topology that can connect many nodes while having a fewer number of links per node, short delay time between nodes, and a minimum configuration links was carried out.

Unlike the above, the High Performance Computer System developed by Stephen R. Colley is a system having a low data delay time and connection expendability in comparison with other direct inter-connection network using a hyper-cube connection structure (R. Colley, et al., High Performance Computer System, U.S. Pat. No. 5,113,523, May 12, 1992.).

However, the High Performance Computer System developed by Stephen R. Colley is characterized by the fact that the number of links per node is increased as the number of system nodes is increased and accordingly, the system can not be easily expanded.

To solve the above problem, Birrell, A D developed the High-Speed Mesh Connected Network that ensures easy expendability of the system.

The above invention is characterized in that the system can be easily expanded without extra cost with each node having the same number of links (Birrell, A D, High-Speed Mesh Connected Local Area Network, U.S. Pat. No. 5,088, 091.).

Recently, parallel processing systems characterized by flexible expendability with mesh connection structures have been commercialized successfully.

However, these types of mesh connection structures provide excellent connection expendability but in a large-sized system their data transmission delay latency between nodes are found to be too long. Data transmission delay time such as the above deteriorates the performance of entire system and accordingly Torus-mesh and 3-D mesh connection structures have been studied and researched. Torus-mesh and 3-D mesh connection structure such as the above, have been able to shorten delay time considerably relative to the existing mesh connection structure. However, its weakness remains nonetheless due to the characteristics of the basic connection structure.

To overcome the characteristics of direct/indirect interconnection networks as described in the above, Robert C. Zak successfully developed an inter-connection network of the intermediary type (Robert C. Zak, et al., Parallel Computer System including arrangement for transferring messages from a source processor to selected ones of a plurality of destination processors and combining responses, U.S. Pat. No. 5,265,207, Nov. 23, 1993.). The interconnection network of the Parallel Computer System developed by Robert C. Zak is capable of providing excellent expendability with a fat-tree connection structure. Each cluster is made up of four nodes and 8×8 cross bar switch devices. In addition, it can tolerate a single fault by providing a dual link and has a fat-tree connection structure characterized by a same transmission bandwidth of all links. However, the interconnection network requires many hierarchies when configuring a large-cited system and accordingly, delay latency is increased to as many as the number of crossbar switches that are passed during data transmission. A great length of time is required in order to send data by the packet unit since a basic data transmission width is narrow. This time delay refers to the time from the instance of transmit part sending data to the instance of receiving data by the receive part. Accordingly, data to be sent from the transmit part experiences a little delay time when they pass through a small number of crossbar switches. Therefore, system performance improves as delay time decreases. At this time, operating frequency, protocol, and network topology are determining factors for reducing delay time. For example, the above hierarchical interconnect network requires a long delay time since data are sent via three crossbar switches when two lower clusters are formed.

SUMMARY OF THE INVENTION

The objective to the present invention is to provide a hierarchical crossbar interconnection network for a cluster based parallel processing computer that is operated via a hierarchical crossbar connection network, capable of ensuring excellent scalibility, short delay time, single fault-tolerance, and low design cost.

In accordance with one aspect of the present invention, there is provided an inter-connection network capable of supporting a cluster-based parallel processing system having a hierarchical structure with, two crossbar networks that include eight dual-links for eight nodes and two dual-links for connecting other clusters; eight processing nodes are connected to form a low-level cluster, and a high-level cluster is formed by connecting eight low-level clusters and four crossbar networks; one next high-level cluster is formed by connecting eight high-level clusters and eight crossbar networks.

The inter-connection network of the present invention is also characterized by the following: when connecting two-level clusters or connecting two high-level clusters, links can be directly connected without the use of another crossbar network, to ensure data transmission/receiving with minimum delay time between other low-level clusters.

Eight processing nodes in a single cluster send/receive data directly via a duplicated crossbar network.

The crossbar network is configured in a single stage and processing nodes in a single cluster transmit/receive data with a minimum delay time.

The crossbar network discussed above is composed of ηth number of crossbar switches that have been byte sliced, eight dual-links for connecting eight nodes, and two dual-links for connecting other clusters. The crossbar switches that have been byte sliced perform the same function.

That is, ηth number of crossbar switches that have been byte sliced (example: Crossbar Switch) carat the path control so that data can be sent to the same receive node and each crossbar switch that has been byte sliced sends ηth divided data of a same data packet.

The low-level, high-level, next high-level used to describe the present invention correspond respectively to level 0, level 1, and level 2.

On the other hand, one single cluster of a parallel processing computer having a hierarchical cluster structure is defined with one low-level cluster and forms a high-level cluster by connecting more than two low-level clusters.

Accordingly, two low-level cluster connections are carried out directly via duplicated link without the use of another crossbar network so that data can be sent/received without much delay time by going through two stages crossbar networks (here, the stage means the number of crossbar switches).

One high-level cluster having a maximum of 64 processing nodes is formed through the use of another crossbar network when connecting less than eight low-level clusters.

All of the processing nodes in a cluster use a duplicated connection link to allow single link fault or single switch fault generated on the hierarchical crossbar network.

In addition, the hierarchical crossbar network of the present invention can transmit/receive data without experiencing much delay time when connecting two high-level cluster connections; that is, it directly connects two high-level clusters without using another crossbar network and accordingly, data are sent/received without much delay via four stage crossbar networks -of processing nodes within other high-level clusters.

The hierarchical crossbar network of the present invention employs a Virtual Cut-Through Routing Technique in order to transmit data packets between nodes without experiencing much delay time.

The Virtual Cut-Through Routing technique employs a buffer for storing the data of network and temporarily stores data on the buffer when a path to which data are to be sent is blocking.

On the contrary, when no path is used in the entire network, data are sent to destinations via an entire network without storing.

In addition, the hierarchical crossbar network of the present invention uses one of two dual-links for connecting high-level clusters to send data to a same destination node; if one of the two dual-links are under use, data are sent via another dual-link.

Packet structure is defined for sending the data of the hierarchical crossbar network of the present invention.

The packets are made up of a header part and data part and the header part is further classified into a tag and control information flit.

The tag included tag information having an eight bit size. It is composed of nth tags that are the same, used for the interconnection network that has been byte sliced whereas control information flit is composed of a flit having n byte size.

The flit is a packet forming unit. That is, it is a data unit that can be sent physically at the same time.

If the flit size is 32 bits, there are 32 transmission lines.

Moreover, the data part is composed of several data flits by the unit of one flit having n byte size.

The packets are generated and sent from the transmit nodes in the cluster and are sent to the receive node via the hierarchical crossbar network.

Here, the nodes can be used as transmitting nodes or receiving nodes and they are capable of sending or receiving data.

At this time, nodes can designate packet types, information to be sent urgently, broadcast information, and the addresses of receiving nodes on a tag and then, sends them to the hierarchical crossbar network.

Based on this, the crossbar network in the hierarchical crossbar network interprets the tag of a packet and sends data to the receive node on the address of the packet.

One crossbar network in the hierarchical crossbar network of the present invention interprets the tag of a packet and sends the remaining part of the packet excluding the packet tag as output.

Accordingly, the receive node always receive control information flit and data part excluding packet tags.

Packets for multi-tag structure are used in the hierarchical crossbar network of the present invention and this type of multi-tag structure generates the required number of tags in accordance with the cluster structure and then, transmits to the network.

In addition, the number of the multi-tags is the same as the number of stages of the crossbar network that passes via the receiving nodes. The generation of multi-tags is supervised by the transmitting node of the crossbar network.

BRIEF DESCRIPTION OF THE DRAWINGS

The above object and other objects, Features and advantages of the present invention will be more clearly understood from the following detailed description taken in conjunction with the accompanying drawings, in which:

FIGS. 5A to 5D are configuration diagrams of a packet having a multi-tag structure.

DETAILED DESCRIPTION OF THE INVENTION

Figure 1:
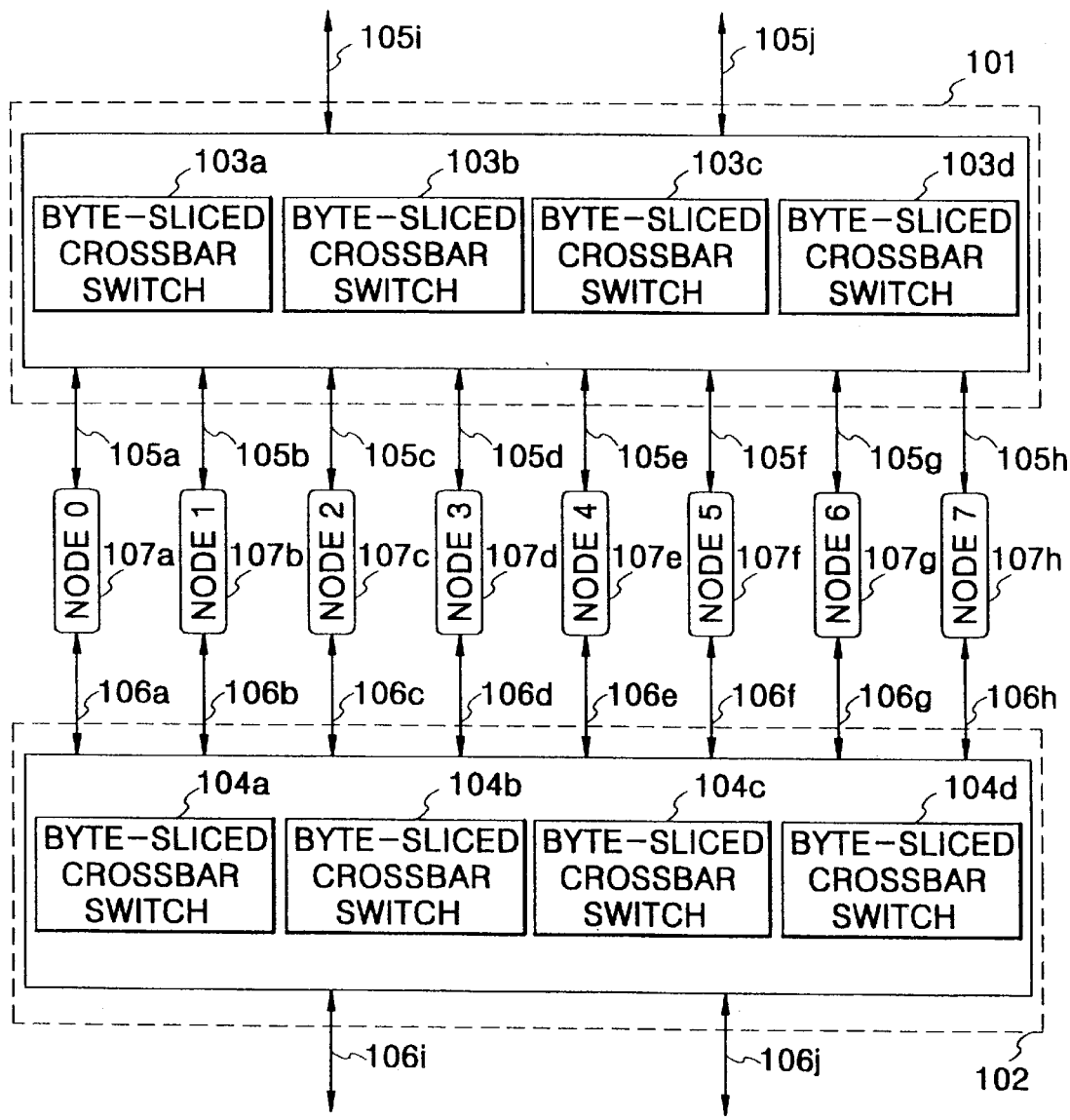
FIG. 1 is a brief diagram of a hierarchical crossbar connection network that has formed lower level clusters.

Referring to FIG. 1, there is shown a block diagram of a crossbar connection network 101 that comprises n number of switches 103a–103d that have been byte sliced, eight links 105a–105h for connecting eight processing, or eight nodes lower level clusters 107a–107h, and two links 105i and 105j for constructing a higher level cluster or two same level clusters.

Similarly, the remaining crossbar network 102 comprises of n number of switches 104a–104d that have been byte sliced, eight processing links 106a–106h for connecting eight nodes, or eight Lower level clusters, 107a–107h, and two links 106i and 106j for connecting a high-level cluster.

In addition, nodes 107a–107h, links 105a–105h and 106a–106h are respectively connected so as to enable them to send and receive data. Accordingly, each node can receive/send all the data via links or use one link for sending data and another for receiving data simultaneously.

One low-level cluster is composed of a maximum of eight nodes 107a–107h and the two crossbar networks 101 and 102. Each node 107a–107h uses two links 105 and 106 to form a dual-link so as to tolerate single link faults or single switch faults generated in the connection network. The crossbar network 101 and 102 of each cluster is made up of n number of crossbar switches that have been byte sliced and each crossbar switch 103a–103d and 104a–104d is used to carry out the same function. Two links on the crossbar network 101 are respectively connected to links of additional crossbar networks to construct a higher level cluster or links of other same level clusters to construct two same level clusters. If one of two links 105i and 105j is under use, the adaptive routing is performed to other link so that data can be accurately sent to a same destination. Two links 106i and 106j on another crossbar network 102 are the same as the above.

Figure 2:
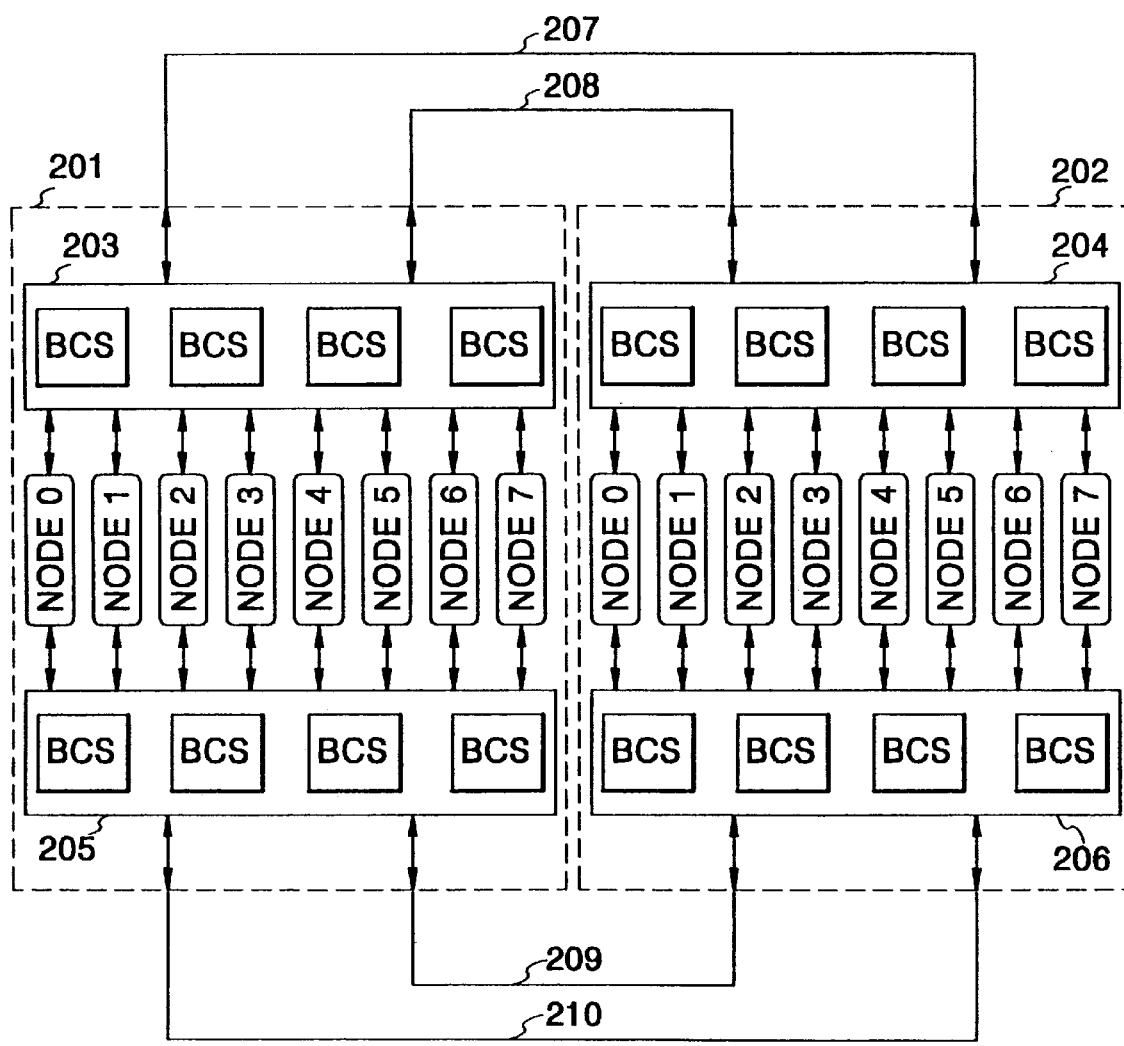
FIG. 2 is a diagram illustrating the connection between two lower level clusters.

In FIG. 2, the connection diagram between two low-level clusters is illustrated.

As shown in the diagram, two low-level clusters 201 and 202 are directly connected to each other without using the high-level crossbar network.

Two crossbar networks 203 and 205 in one cluster 201 respectively have two links 105i and 105j for connecting high-level clusters and accordingly, they can form four connection links 207–210 between two low-level clusters. Since four connection links 207–210 exist between a node in one cluster and a node in another cluster, the performance of the network is not affected when faults occur on one of four links that have been connected or a single link fault or single switch fault generated on a low-level cluster network.

Figure 3:
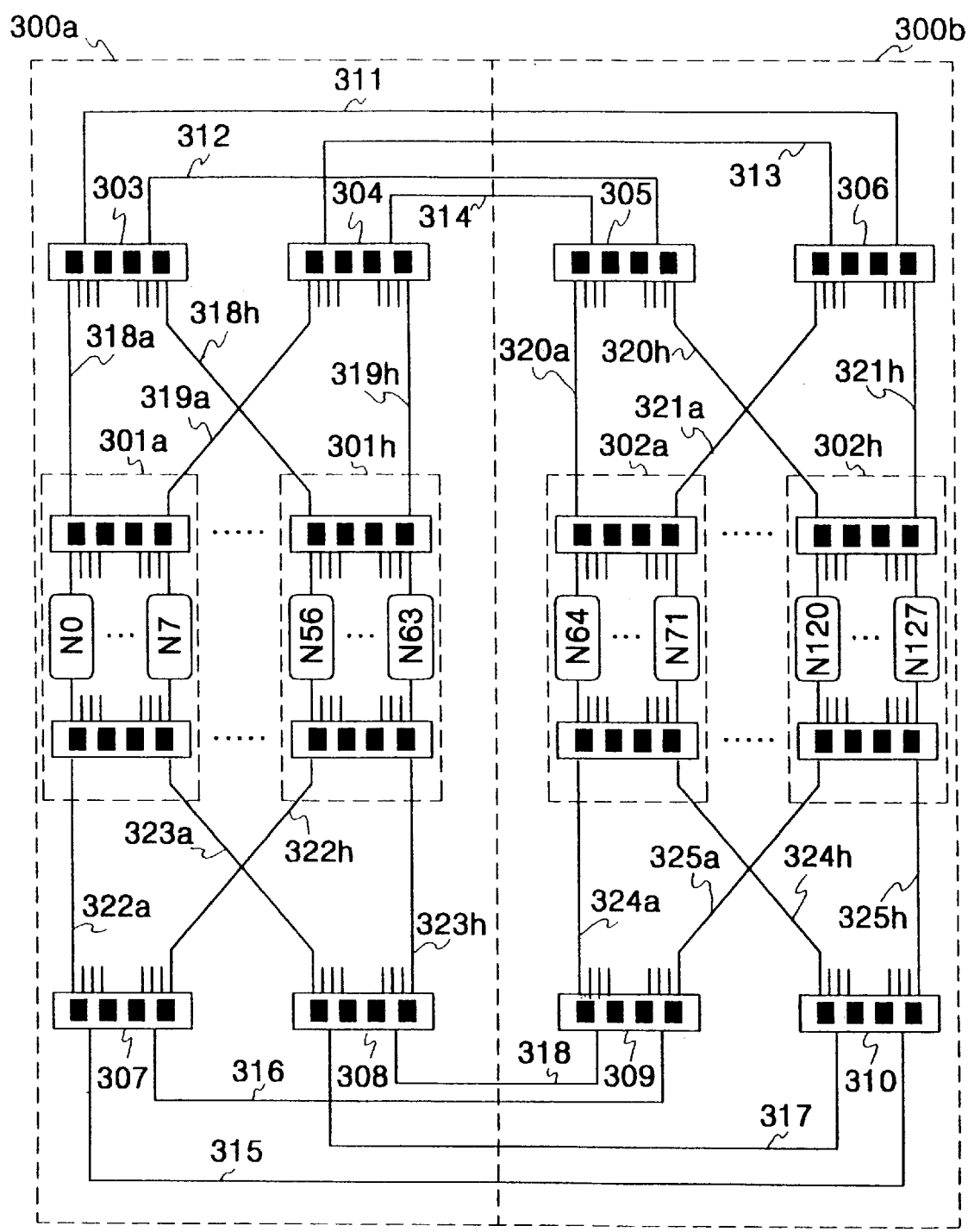
FIG. 3 is a brief diagram of a hierarchical crossbar connection network having 128 nodes.

FIG. 3 shows a brief diagram of a hierarchical crossbar network having a maximum of 128 nodes that are connected to two high-level clusters made up of eight low-level clusters respectively. One high-level cluster 300a is composed of eight low-level clusters 301a–301h, the n number of crossbar networks 303, 304, 307, and 308, and several connection links 318a–318h, 319a–319h, 322a–322h, and 323a–323h. Up to 64 nodes can make up one high-level cluster 300a and two links are provided between nodes in a same low-level cluster and four connection links are provided between nodes in other low-level cluster. Since low-level clusters 301a–301h have four links for constructing a high-level cluster, four additional crossbar networks 303, 304, 307, and 308 are for forming a high-level cluster. One crossbar network 303 has eight links 318a–318h for connecting low-level clusters and two connection links 311 and 312 for forming next high-level clusters. Three other high-level crossbar networks 304, 307, and 308 respectively have eight links 319a–319h, 322a–322h, and 323a–323h for connecting low-level clusters and two links for forming a next high-level cluster 313–318 as well. Eight links 318a–318h, located on the crossbar network 303 are respectively connected to each link of eight low-level clusters 301a–301h. In addition, each link 319a–319h, 322a–322h, and 323a–323h of three other high-level crossbar networks 304, 307, and 308 is respectively connected to one link of eight low-level clusters 301a–301h.

Another high-level cluster 300b is made up of eight low-level clusters 302a–302h, several crossbar networks 305, 306, 309, and 310, and several connection links 320a–320h, 321a–321h, 324a–324h, and 325a–325h. It also has a maximum of 64 nodes. In addition, it provides two paths between the nodes in the same low-level cluster and provides four connection links between other low-level clusters.

Since each of low-level clusters 302a–302h has four links, four additional high-level crossbar networks 305, 306, 309, and 310 are used in order to form a high-level cluster. One crossbar network 305 has eight links 320a–320h for connecting low-level clusters and two connection links 312 and 314 for forming a next cluster. Moreover, each of other three crossbar networks 306, 309, and 310, respectively has eight links 321a–321h, 324a–324h, and 325a–325h for connecting low-level clusters and two connection links 311, 313, 315, 316, 317, and 318 for forming a next high-level cluster. Each of eight links located on the crossbar network 305 is connected to one of eight links for connecting the high-level clusters of low-level clusters 302a–302h. Moreover, each link 321a–321h, 324a–32dh, and 325a–325h of three other high-level crossbar networks 306, 309, and 310 is connected to one link of eight low-level clusters 302a–302h.

FIG. 3 shows a structure capable of connecting a maximum of 128 nodes by connecting two high-level clusters. Between two high-level cluster, a total of eight connection links are formed 311–318.

Two high-level cluster 300a and 300b directly connected in the manner that eight links of one high-level cluster are respectively connected to eight links of the other high level cluster without any restriction.

The following connection rule is recommended for connecting links between two high-level clusters; two links 311 and 312 of one crossbar network 303 in one high-level cluster 300a are connected to links 311 and 312 of two crossbar networks in the other high-level cluster 300b whereas two links 313 and 314 of another crossbar network 304 in one high-level cluster 300a are connected to links 313 and 314 of two crossbar networks 305 and 306 in another high-level cluster 300b.

Similarly, two links 315 and 316 of one crossbar network 307 in one high-level cluster 300a are connected to links 315 and 316 of two crossbar networks 309 and 310 in other high-level cluster 300b. Moreover, two links 317 and 318 of another crossbar network 308 in one high-level cluster 300a is connected to links 317 and 318 for connecting another next high-level clusters of two crossbar networks 308 and 310 in another high-level cluster 300b.

Based on the above, the present invention can support effectively a hierarchical structured parallel processing system since it is capable of being expanded through the forming of one next high-level clusters by connecting a maximum of eight of the high-level circuits and eight additional crossbar networks.

Figure 4A:
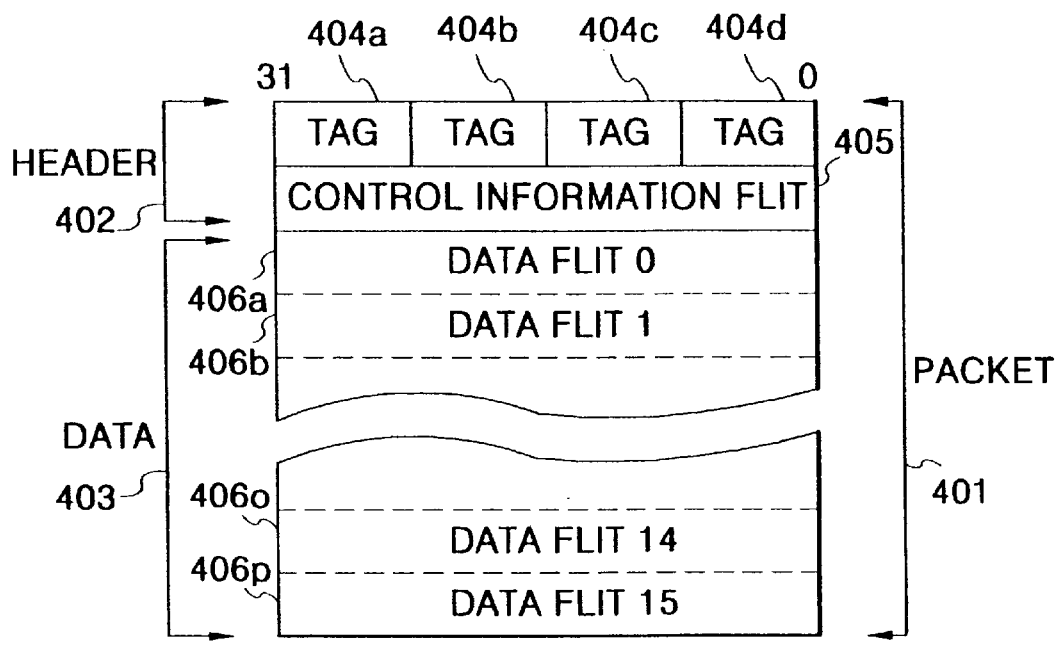
FIG. 4A is a structure diagram of a transmission packet.

In FIG. 4A, the structure of packet required for sending data to destination nodes on the hierarchical crossbar network is illustrated.

The packet 401 is made up of a header part 402 and data part 403. The header part 402 is further classified into tags 404a–404d and control information flit 405. Moreover, the tags 404a–404d have tag information having a eight bit size. They form the "n" number duplicated tags used for interconnection network that has been byte sliced to be used in an a hierarchical crossbar network having a n byte size. These tag information are composed of eight bits. Four duplicated tag information are made up of 32 bits to be used as tag information flit having a size of 32 bits. That is, the four duplicated tag information are used for four switches that have been byte sliced, routing to the same receiving node.

If an assumption is made that the one flit is composed of 32 bits and that there are four switches that have been sliced, each one crossbar switch supervises routing and transmission by the unit of eight bit among 32 bits data. The control information flit 405 is information necessary for controlling packets used to send data from a transmit node to a receive node. It is made up of one flit having an "n" byte size. That is, the control information is information for packets used for the proper operation carried out at the receive node in accordance with packet types, sizes, and forms. They are used for the information transmission between the transmit node and receive node. In addition, the data part 403 is composed of several data flits 406a–406p. The packet 401 is generated and transmitted from the transmitting node of a cluster and is sent to the receive node via the hierarchical crossbar network. That is, the transmitting node designates packet types (PC) 407, urgent transmit information (E) 408, broadcast information (B) 409, and the address of receive node (stag) 410 on the tags 404a–404d and then, sends to the hierarchical crossbar network.

Based on the above, the hierarchical crossbar network interprets the tags 404a–404d of a packet 401 and carries out a designated function on the packet tags 404a–404d. Then, as the execution result, it sends control information 405 and data part 403 excluding the tags 404a–404d to the output of the hierarchical crossbar network. The data part 403 of the packet 401 is formed into several data flits 406a–406p. The number of the data flits 406a–406p sent at this time is determined at the transmit node. By doing so, the performance of the entire system can be improved considerably by allowing variable data sizes without fixing the sizes of data of a packet 401 being sent.

Figure 4B:
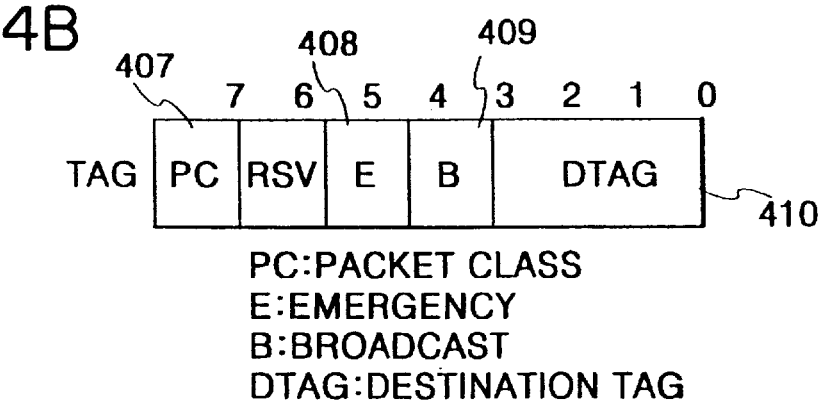
FIG. 4B is a structure diagram of a packet tag.

In FIG. 4B, one of the "n" number of packet tags 404a–404d is illustrated. It is used to designate packet types (PC: Packet Class) 407, urgent transmit information (E: Emergency) 408, broadcast information (B: Broadcast) 409, and the address of receive node (DTag: Destination Tag) 410.

The packet type 407 classifies whether the packet 401 is a data packet that is sent to a destination receive node or a system packet that is sent to the destination hierarchical network. In addition, the urgent transmit information 408 is used to send the packet 401 to the receive node prior to other general packets. The broadcasting transmit 409 is used to send the same data to all the nodes connected to the crossbar network without designating any receive nodes. Then, the address 410 of the receive node designates one of eight link addresses for connecting lower level clusters or one of two links addresses for forming a higher level.

Illustrated in FIG. 5 is an example of packet configuration having a multi-tag structure used in the hierarchical interconnection network shown in FIG. 2 and FIG. 3.

As the first example, the packet 501 for one low-level cluster illustrated in FIG. 1 is configured with one tag 404a–404d, one control information 405, and data part 403 as shown in FIG. 5A. As the second example, the packet 502 for two directly connected low-level clusters illustrated in FIG. 2 is configured with two tags 404a–404d, one control information flit 405, and data part 403 as shown in FIG. 5B. The packet 501 is used during the data transmission between the nodes in the same low-level clusters. In addition, the packet 502 is used for the data transmission between nodes in other low-level cluster. As the third example, the packet 503 for one high-level cluster illustrated in the FIG. 3 is made up of three tags 404a–404d, one control information flit 405, and data part 403 as shown in FIG. 5c. This packet 503 is used for the data transmission between nodes in other low-level cluster and the packet 501 is used for the data transmission between nodes in the same low-level cluster. As the fourth example, the packet 504 for two high-level clusters shown in FIG. 3 is made up of four tags 404a–404d, one control information 405, and data part 403 as illustrated in FIG. 5D.

Here, the packet 504 is used for data transmission between nodes in another high-level cluster and the packet 503 is used for data transmission between the nodes in different lower level clusters of the same high-level cluster. In addition, the packet 501 is used for data transmission between the nodes in the same high-level cluster and the same low-level cluster. That is, the packet allows the sizes of data of transmit packet 401, to be changed without fixing them in order to improve the performance of the system in the hierarchical crossbar inter-connection network. Multi-tags can be used in accordance with the connection status of low-level cluster or high-level cluster to send the packets to the receive node.

As has been described, the hierarchical crossbar network architecture of the present invention offers excellent scalability, data width expendability, low delay latency, tolerating of a single fault, and low design cost in a large size parallel processing system and hierarchical structure.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A hierarchical crossbar interconnection network for parallel processing computer, having clusters of nodes and crossbar networks, comprising:
   a crossbar network is composed of "n" (any integer) number of crossbar switches, eight links for connecting lower level clusters or processing nodes, and two links for connecting other clusters;
   a low-level cluster is formed by connecting a maximum of eight processing nodes between two crossbar networks;
   a high-level cluster is formed by connecting a maximum of eight low-level clusters between four crossbar networks; and
   a hierarchical crossbar interconnection network for a cluster-based parallel processing computer, having low delay latency is formed by directly connecting two low-level clusters or by directly connecting two high-level clusters.

2. The hierarchical crossbar interconnection network as set forth in claim 1, wherein in the crossbar interconnection network for a cluster-based parallel processing computer, the two low-level clusters are directly connected via four links so that data are sent/received between processing nodes in other low-level clusters with low delay latency.

3. The hierarchical crossbar interconnection network as set forth in claim 1, wherein in the hierarchical crossbar interconnection network for a cluster-based parallel processing computer, the two high-level clusters are directly connected via eight links for connecting next high-level so that data are sent/received between processing nodes in other high-level cluster with low delay latency.

4. The hierarchical crossbar interconnection network as set forth in claim 1, wherein the hierarchical crossbar interconnection network for a cluster-based parallel processing computer has packets that include the same multi-tags for the inter-connection network that has been byte sliced, a packet header including control information, and several data flits, each flit being of an n byte size so as to send data from a transmitting node to a receiving node in the clusters.

5. The hierarchical crossbar interconnection network as set forth in claim 1, wherein the hierarchical crossbar interconnection network for a cluster based parallel processing computer in which said multi-tag includes packet type information used to classify data packets that are sent to a receiving node and system packets that are sent to the crossbar network, urgently transmitted information that are used to send high-priority data, broadcast information that are used to send the same data to all the nodes connected to the crossbar network without designating the receiving nodes, and the address of the receiving nodes that are used for designating specific receiving nodes.

6. The hierarchical crossbar interconnection network as set forth in claim 1, wherein the hierarchical crossbar interconnection network for a cluster-base parallel processing computer, in which said crossbar network interprets the tags of the packets and sends the control information and data part excluding the tags of said packets to the address of the receiving nodes.

7. The hierarchical crossbar interconnection network as set forth in claim 1, wherein in the hierarchical crossbar interconnection network for a cluster-based parallel processing computer said packets allow the sizes of the data of transmitting packets to be changed.

8. The hierarchical crossbar interconnection network as set forth in claim 1, wherein in the hierarchical crossbar interconnection network for a cluster-based parallel processing computer said packets are sent to the receiving nodes through the use of a certain number of said multi-tags in accordance with the connection state of low-level clusters or high-level clusters.

9. A hierarchical crossbar interconnection network for cluster-based parallel processing computer, comprising:
   a crossbar network having a single stage and being composed of "n" number (any integer) of byte-sliced crossbar switches, eight links for connecting lower level cluster (or processing nodes), and two links in order to construct a higher level cluster by connecting links of additional crossbar networks or to construct two same level clusters by directly connecting links of other same level cluster;
   a low level (or level 0) cluster formed by connecting a maximum of eight processing nodes between two crossbar networks in the manner that one link of each of the processing nodes is connected to one of the two crossbar networks and the other link of each of the processing nodes is connected to the other of the two crossbar networks; and
   a high-level (or level 1) cluster formed by connecting a maximum of eight low-level clusters between four additional crossbar networks in the manner that four links of each of the low-level clusters are respectively connected to each link of the four crossbar networks.

10. The hierarchical crossbar interconnection network as set forth in claim 9, wherein each low-level cluster of the hierarchical crossbar interconnection network has four links in order to construct a high-level cluster by connecting four additional crossbar networks or to construct two low-level clusters by connecting four links of same level cluster directly, and the low-level clusters can be directly connected to produce lower delay latency in the manner that four links of one low-level cluster are respectively connected to four links of the other low-level cluster freely.

11. The hierarchical crossbar interconnection network as set forth in claim 9, wherein each high-level cluster of the hierarchical crossbar interconnection network has eight links in order to construct a next high-level cluster by connecting eight additional crossbar networks or to construct two high-level clusters by connecting eight links of same level cluster directly, and the two high-level clusters can be directly connected to produce lower delay latency in the manner that eight links of one high-level cluster are respectively connected to eight links of the other high-level cluster without any restriction.

12. The hierarchical crossbar interconnection network as set forth in claim 9, wherein the hierarchical crossbar interconnection network has packets that are made up of multi-tags consisting of multiple tag flits each having the n number of duplicated tags corresponding to the byte-sliced crossbar network, control information flit, and several data flits each having an n byte size so as to send data from the transmit node to the receive node in the clusters.

* * * * *